No. 880,908. PATENTED MAR. 3, 1908.
G. NIEBEL.
FERTILIZER DISTRIBUTER.
APPLICATION FILED MAY 28, 1907.
3 SHEETS—SHEET 1.
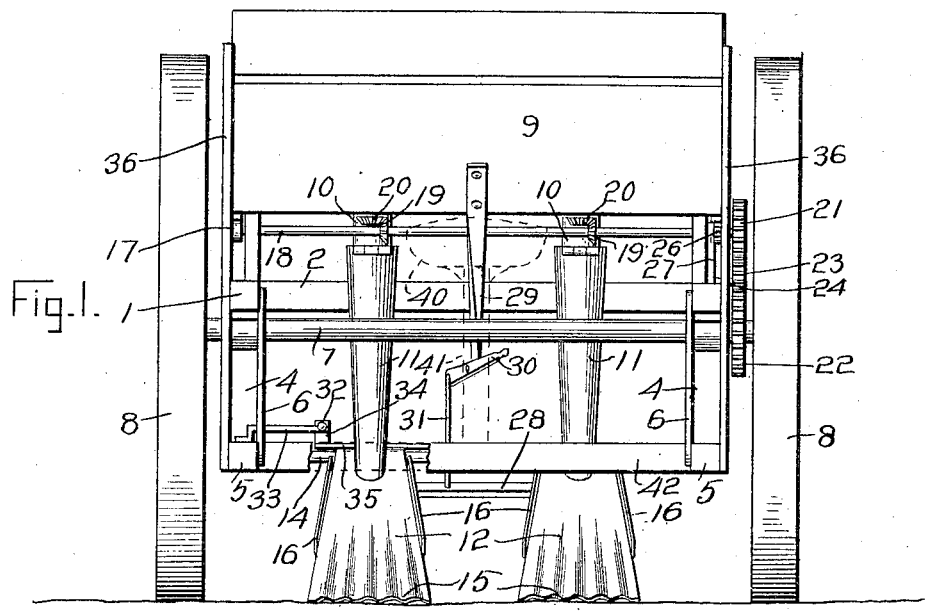
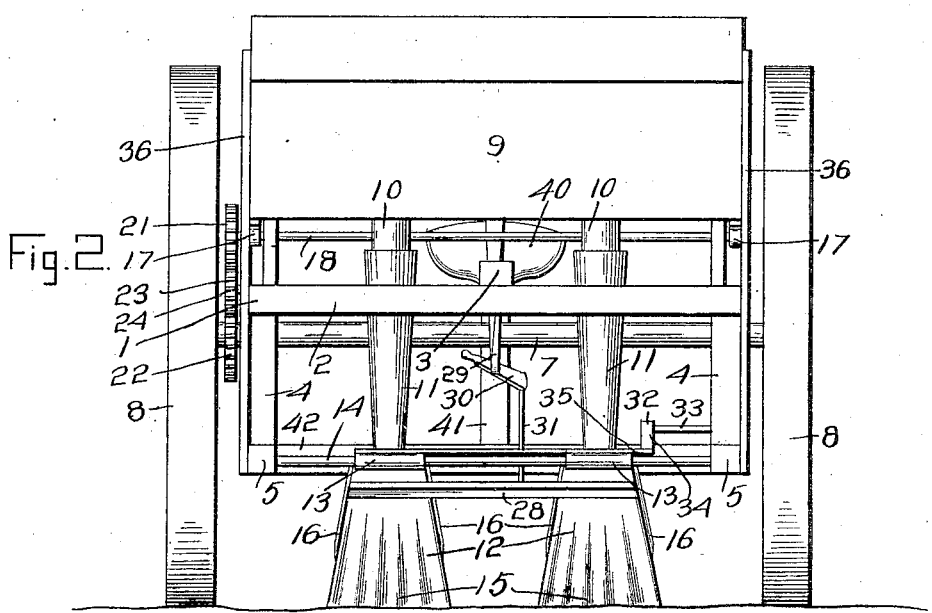

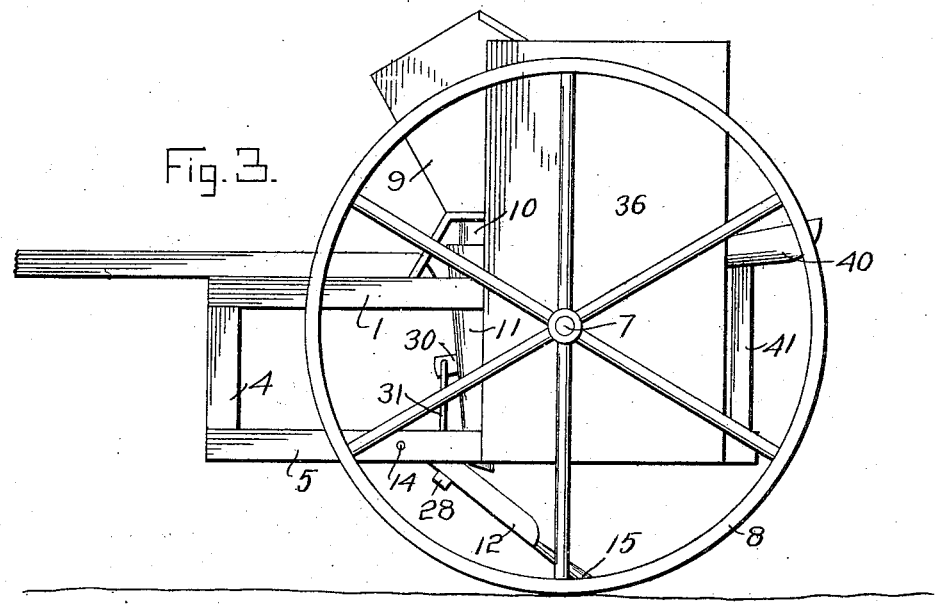
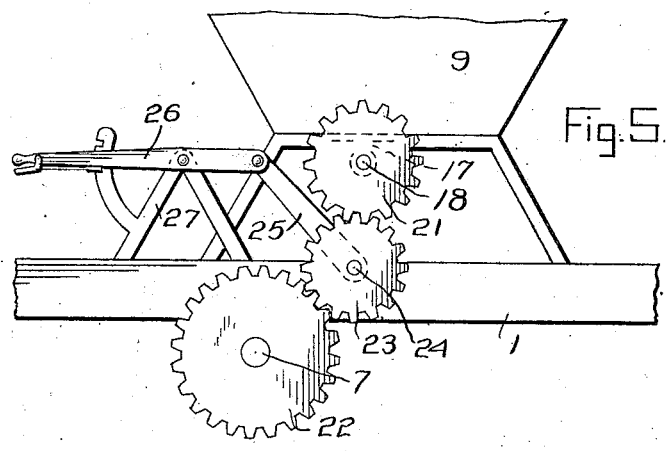

No. 880,908. PATENTED MAR. 3, 1908.
G. NIEBEL.
FERTILIZER DISTRIBUTER.
APPLICATION FILED MAY 28, 1907.

3 SHEETS—SHEET 3.

Witnesses
C. F. Kirchenbach.
John S. Powers

Inventor
George Niebel.
By Chandler & Chandler
Attorneys.

UNITED STATES PATENT OFFICE.

GEORGE NIEBEL, OF DUNKIRK, NEW YORK.

FERTILIZER-DISTRIBUTER.

No. 880,908.  Specification of Letters Patent.  Patented March 3, 1908.

Application filed May 28, 1907. Serial No. 376,139.

*To all whom it may concern:*

Be it known that I, GEORGE NIEBEL, a citizen of the United States, residing at Dunkirk, in the county of Chautauqua, State of New York, have invented certain new and useful Improvements in Fertilizer-Distributers; and I do hereby declare the following to be a full, clear, and exact description of the invention, such as will enable others skilled in the art to which it appertains to make and use the same.

This invention relates to new and useful improvements in fertilizer distributers and it has particular reference to a machine of this type including depending tubes from a hopper, agitating means, and distributing plates arranged beneath the tubes, the primary object being to provide means for distributing the fertilizer at each side of the plates and without allowing the same to drop upon the foliage thereof.

Figure 4:
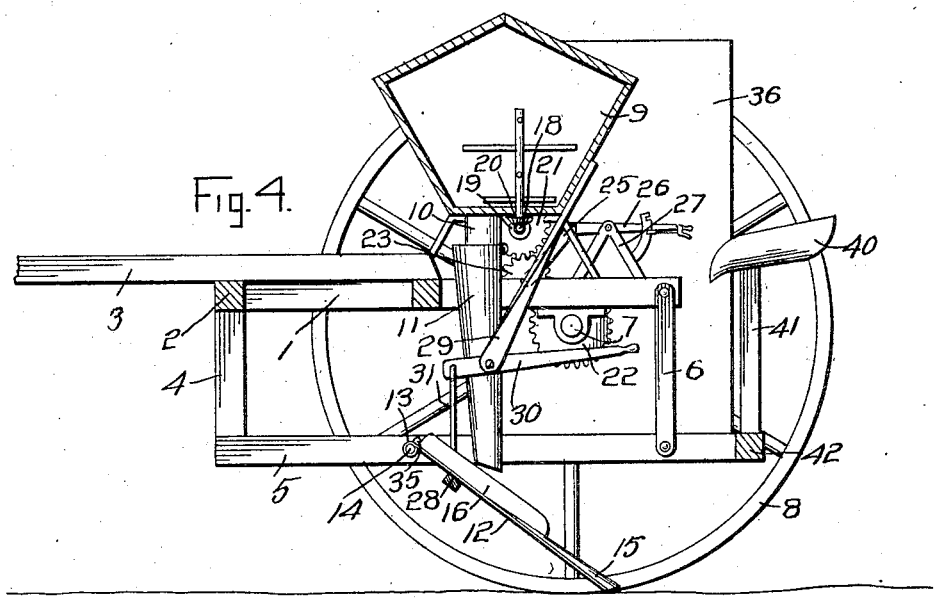
Figure 6:
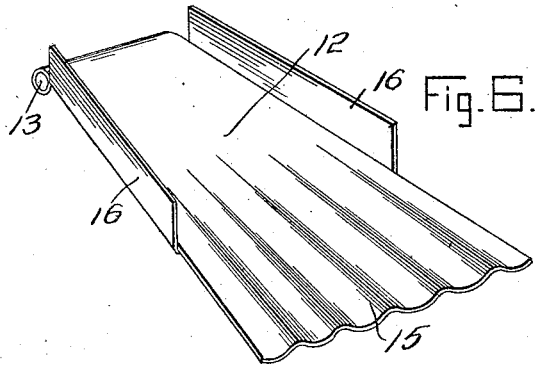

The invention resides in the novel construction, combination and arrangement of parts, the details of which will appear in the course of the following description, in which reference is had to the accompanying drawings, forming a part of this specification, like characters of reference designating similar parts throughout the several views, wherein:

Figure 1 is a rear elevation of a machine constructed in accordance with the present invention. Fig. 2 is a front elevation thereof. Fig. 3 is a side elevation thereof. Fig. 4 is a longitudinal sectional view thereof. Fig. 5 is a detailed view of the gearing for operating the distributing mechanism from the power shaft. Fig. 6 is a detailed perspective view of one of the distributing plates, the other plate being counterpart in construction.

Referring specifically to the accompanying drawings, the numeral 1 designates a wheeled frame from the front bar 2 of which, projects the tongue 3. Depending from the front portions of the frame 1 are vertical bars 4 which support rearwardly extending bars 5, the latter being braced by vertical connecting members 6 engaged with the side bars of the frame 1. The said side bars are constructed with bearings in which is journaled a transverse shaft 7 carrying at its ends traction wheels 8. Upon the frame 1 is supported a hopper 9 in which the fertilizing material is placed and which contains any suitable agitating mechanism of conventional form. Depending from the hopper 9 are the discharge pipes 10 to which are pivoted tubes 11, the latter overlying distributing plates 12 which at their front ends are formed with extended loops 13, engaged about a transverse rod 14 and affording a pivotal mount for the plates 12. The latter have their bases corrugated longitudinal as at 15 so as to effect a uniform distribution of the fertilizing material, and at the sides of the base portions are mounted upwardly extending longitudinal members 16 to prevent the fertilizer from being blown away. The hopper 9 is provided with depending bracket bearings 17 in which is journaled a transverse shaft 18, the latter carrying bevel pinions 19, which mesh with similar pinions 20 journaled in the bottom of said hopper and connected by any suitable means with the agitating mechanism. The shaft 18 projects at one side and carries a pinion 21. A pinion 22 is provided upon the shaft or axle 7 and between the pinions 21 and 22 is a transmission pinion 23 which is mounted upon a suitable shaft 24, the latter being carried at the lower end of a link 25. The link 25 at its upper end has pivotal connection with the rear end of a lever 26 which is pivoted between its ends to a bracket 27.

The distributing plates 12 rest upon a transverse bar 28 arranged therebeneath. Depending from the hopper 9 is a bar 29 to which a lever 30 is pivoted between its ends, and the latter at its projecting rear end has loose pivotal connection with a link 31 which is in turn pivoted to the bar 28 centrally thereof. Plates 12 are designed for restricted sliding adjustment in either direction upon the bar 14, independently of their pivotal movement and with this object in view, a lever 32 is pivoted to a bracket 33 secured as shown to the left hand side bar 5. The lever 32 projects rearwardly and has a depending portion 34 which is connected at its lower end by a link 35 to the adjacent structure of the plate 12. The side bars 1 and 5 conjointly support at each side of the machine enlarged plates 36 which constitute a wind shield for the operator, the latter being stationed upon a seat 40 carried by a post 41, which is secured to a cross piece 42 spanning the rear ends of the bars 5.

In operation, as the machine traverses the field, the lever 30 is raised on its pivot and in such action, by means of the connections described, lowers the plate 12 so that the material gravitating thereupon from the tubes 11 will be fed to the base of the flange, it being understood that said distributers are disposed on either side of the row. Should the plants grow in irregular formation, the lever 32 is swung on its pivot to impart corresponding lateral movement to the plates 12. Fertilizing material by virtue of this arrangement and operation of parts, will be fed to the roots of the plants and will not be distributed upon the foliage thereof. This action is rendered more efficacious by the provision of the side pieces 16.

A machine constructed in accordance with the present invention is simple, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. A machine of the type set forth comprising in combination with a feed hopper and distributing tubes depending therefrom, a transverse bar, distributing plates arranged for pivotal and sliding movement on said bar beneath said distributing tubes, lever operated means for raising and lowering said plates on their pivots, and lever operated means for moving said plates laterally in either direction.

2. A machine of the type set forth, comprising in combination with a feed hopper and distributing tubes depending therefrom, of distributing plates arranged for pivotal and sliding movement beneath said tubes, means for moving said plates on their pivots and means for moving said plates laterally in either direction.

3. A machine of the type set forth, comprising in combination with a feed hopper and distributing tubes depending therefrom, distributing plates arranged beneath said tubes for pivotal movement and means for moving said plates on their pivots.

4. A machine of the type set forth, comprising in combination with a feed hopper and distributing tubes depending therefrom, distributing plates arranged beneath said tubes for pivotal movement and means for moving said plates simultaneously on their pivots.

5. A machine of the type set forth, comprising in combination with a feed hopper and distributing tubes depending therefrom, distributing plates arranged beneath said tubes for lateral movement with relation thereto and means for moving said plates laterally in either direction.

6. A machine of the type set forth, comprising in combination with a feed hopper and distributing tubes depending therefrom, distributing plates arranged beneath said tubes for lateral movement with relation thereto and means for moving said plates laterally and simultaneously in either direction.

In testimony whereof, I affix my signature, in presence of two witnesses.

GEORGE NIEBEL.

Witnesses:
LEROY C. ANDREWS,
SARAH M. RYAN.